Patented June 3, 1941

2,244,546

UNITED STATES PATENT OFFICE 2,244,546

FRUIT AND VEGETABLE SIZER

Harry C. Stockdale, Ravenna, Ohio, assignor to Food Machinery Corporation, San Jose, Calif., a corporation of Delaware Application December 28, 1936, Serial No. 117,778
Renewed September 23, 1939

19 Claims. (Cl. 209—106)

The present invention relates to machines for grading fruit and vegetables according to size, and is more particularly concerned with the provision of an improved machine of this character which is not only well adapted for handling a wide variety of such products, but is especially suitable for handling potatoes or other products of similar characteristics.

Potatoes, for example, are particularly difficult to size accurately and rapidly with such machinery as has heretofore been available, due in part to their elongated shape and occasional surface protuberances, and also to their wide variation in size, which make it difficult to properly present them to the sizing mechanism. Consequently, a great many of the potatoes are frequently discharged at the wrong point so that the packer finds many of the grades containing some potatoes that are too large, and others that are too small for that particular size or grade. These conditions are also frequently greatly aggravated because of the tendency of the operator to feed the potatoes too rapidly, or in too great a mass, so that they pile up and many of them do not have a chance to be properly presented to the sizing mechanism by reason of being carried thereover by other potatoes underneath them.

Moreover, potatoes are often graded when they are new, at which time they are highly susceptible to injury due to their extremely thin and tender skins, so that considerable injury has heretofore resulted from rough handling during the sizing and cleaning operations.

The present invention provides a machine which is capable of effecting rapid and accurate sizing of potatoes, as well as various other fruits and vegetables, without danger of injuring them, and which is also adapted to gently and efficiently clean them in the same operation.

It is a general object of the invention, therefore, to provide an improved machine for rapidly and accurately sizing fruits and vegetables or the like.

Another general object of the invention is to provide a sizer of the character referred to, which applies a cleaning effect during the sizing operation.

Another object of the invention is to provide an improved sizer which operates with substantially no abrasion, bruising, nicking, cutting or other injury to tender skinned products such as potatoes.

Another object of the invention is to provide a sizer of the character referred to, which is of increased capacity and operates efficiently and without injury to the product handled.

Another object of the invention is to provide a sizer of the character referred to, in which overfeeding does not interfere with accuracy of sizing.

A further object of the invention is to provide a sizer of the character referred to, of simple and compact construction, so that it can be manufactured economically and can be used in narrow quarters where only a small floor area is available.

Another object of the invention is to provide a sizer of the character referred to, in which the sizing section can be adjusted easily to change the sizes of the various grades.

Another object of the invention is to provide a sizer of the character referred to which is constructed to facilitate packing of the sized product with a minimum of work and without interruption of the operation of the sizer.

Another object of the invention is to provide a sizer of the character referred to, having sizing rolls constructed to promote economical manufacture and assembly of each sizing roll, as well as to facilitate repair and replacement thereof.

Another object of the invention is to provide a sizer of the character referred to, which can be readily adjusted to increase or decrease the number of sizing sections, so that the product can be separated into more or fewer sizes as desired.

Various other objects and advantages will best be understood as the description progresses in connection with the accompanying drawings, in which.

The machine as illustrated in the preferred embodiment shown, may comprise, generally, a plurality of sizing sections each of which is formed by a plurality of annularly grooved rubber sizing rolls mounted in parallel relation to form valleys therebetween and cooperating to form circular sizing apertures of a selected size in each section, the grooves preferably being provided with resilient rubber spurs or bristles to facilitate sizing as well as to effect cleaning of the product during the sizing operation. A plurality of conventional cylindrical cleaning rolls may also be provided in association with the sizing rolls to augment the cleaning action.

The potatoes are fed to the rolls transversely thereof to pass from valley to valley thereacross, the rolls being driven in a common direction and preferably being so proportioned and driven as to permit the potatoes to be advanced across them by the so-called "displacement" method in which the potatoes are caused to advance only when the tractive effect of the rolls is augmented by the urge of additional potatoes delivered thereto. With each sizing section, delivery devices or chutes are provided to receive the sized potatoes from the sizing rolls and deliver such potatoes to sacks or other receptacles.

Referring to the drawings, the machine includes a supporting framework made up of inclined upper side rails 1 (Figs. 1, 2 and 3) on which the sizing and cleaning rolls are supported, and lower side rails 2 on which the discharge chutes are mounted. Side rails 1 and 2 are suitably secured at their ends to respective corner posts 3, which may be braced in any suitable manner, and lower side rails 2 are joined intermediate their ends by various cross braces 4 on which the discharge chutes are supported. The frame supports all of the various parts of the machine including feed hopper 5 (Figs. 1 and 2); preliminary cleaning rolls 6, which serve to effect a preliminary cleaning operation and to eliminate the smallest or cull size potatoes; an initial set of sizing rolls 7 for separating out the smallest size of marketable potatoes; intermediate cleaning and transfer roll 8; a second set of sizing rolls 9 for separating out an intermediate size of potatoes; and a discharge chute 10 to which the largest size potatoes are discharged from the sizing rolls. The potatoes are confined and guided over the rolls between side guards 11 and 12 which extend between the corner posts. If desired, sideboard 12 may be mounted for easy removal in channel guides 13 on the adjacent corner posts to facilitate access to the rolls for adjustment or repair. Below the several sets of rolls, respective discharge chutes 14, 15 and 16 are provided, as seen most clearly in Fig. 1, to receive the sized potatoes as they are released from the rolls.

All of the rolls 6, 7, 8 and 9 are driven in a common direction as indicated by the arrows, by means of an endless chain 17 extending along one side of the machine and trained around sprockets 18 secured to the respective ends of the drive shafts 19 of the cleaning and transfer rolls 6 and 8, and drive shafts 20 of the sizing rolls 7 and 9. Power to drive the rolls may be supplied from an electric motor 21 mounted on a framework 22 extending between the corner posts 3 at the discharge end of the machine, a suitable drive connection being provided between the motor and the last sizing roll 9. Such drive connection comprises a chain 23 driven from the motor shaft and trained around a sprocket 24 carried on a stub shaft 25 secured to the framework of the machine in any suitable manner. A second sprocket 26 on the stub shaft 25 drives a chain 27 trained around a sprocket 28 secured to the drive shaft of the last sizing roll 9. Preferably, the drive connection from the motor is enclosed by guard casings 29 and 30 which may be mounted on the frame in any suitable manner.

Feed hopper 5 is detachably mounted for vertical adjustment at the feed end of the frame, and is preferably provided with an apertured bottom through which dirt, rocks or other debris can fall. The hopper includes converging side walls 31 which are connected at the bottom by suitable cross pieces 32 which support the slats 33 forming the bottom of the hopper. To provide for detachable mounting of the hopper on the frame, each wall 31 carries a strap 34 having a lateral hook projection 35 at its end to engage behind the offset upper end of a bracket 36 on the adjacent corner post 3, while the inner cross piece 32 engages the corner posts to position the bottom of the feed hopper in an inclined position with respect to the frame. Each bracket 36 is provided with spaced longitudinal slots which are engaged by bolts 37 suitably secured to the posts, so that the feed hopper can be adjusted vertically on the frame to position the bottom thereof in proper relation with respect to the cleaning and sizing rolls.

As previously stated, potatoes which are dumped onto the inclined bottom of the feed hopper 5, are discharged onto the preliminary cleaning rolls 6 (Figs. 1, 2 and 6), both of which may be of cylindrical form as illustrated and made up of a drive shaft 19 having a cylindrical core 42 thereon, about which a mat 43, provided with radially extending resilient spurs or bristles 44, may be wrapped. Preferably, mat 43 and spurs 44 are formed integrally of a resilient material such as soft rubber so that the spurs apply a brushing action to the potatoes passing thereover.

In addition to the cleaning action of the rolls 6, they also serve to separate out the very small or cull size potatoes, and for this purpose they are mounted in spaced apart relation to provide a sizing opening 45 therebetween through which the smallest size potatoes can pass. Preferably, the rolls 6 are also mounted for adjustment to and from each other so that their spacing can be varied to compensate for wear or to vary the size of the opening 45. For this purpose, shaft 19 of each roll 6 has its ends journalled in bearings 46, which are mounted for longitudinal adjustment along the frame, and are preferably made self-aligning.

Each bearing 46 (Figs. 8 and 9) may include a cast base 47 which is flat at the bottom to slidably rest upon a side rail 1 and has depending guide projections 48 for engaging a side of the rail. Base 47 is provided with a vertical tapped aperture to receive a cap screw 49 extending through a longitudinal slot 50 in rail 1. At its upper end, base 47 is provided with a semi-circular seat cooperable with a complementary semi-circular bearing cap 51 in receiving a bearing sleeve 52 mounted therebetween and in which an end of the roll shaft is journalled. Bearing cap 51 may be detachably secured on the base by bolts 53 extending through similar apertured ears 54 of the base and the bearing cap.

Figure 8:
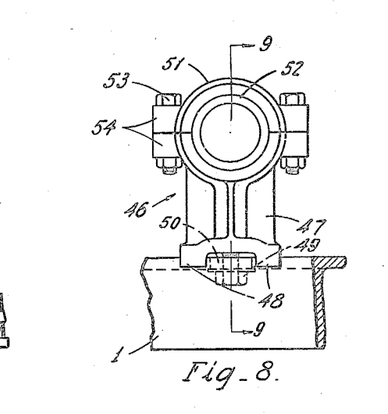
Fig. 8 is an enlarged elevational view of one of the bearings for the rolls, illustrating its construction and its mounting on the frame.
Figure 9:
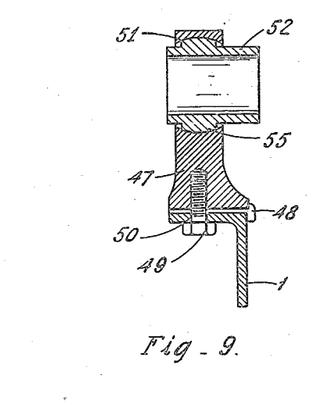
Fig. 9 is an enlarged transverse sectional view of the bearing shown in Fig. 8, the view being taken in the plane of the line 9—9 in Fig. 8.

To provide the self-aligning feature of the bearing, bearing sleeve 52 is provided with an annular boss 55 having its outer surface formed with a spherical contour to engage the complementary formed interior bearing surfaces of base 47 and bearing cap 51. Thus, a universal connection is provided between bearing sleeve 52 and the bracket so that any slight misalignment of a roll shaft 19 with respect to its bearings is automatically compensated for. By this means, the spacing of the cleaning rolls 6 can be quickly and readily adjusted without necessitating accurate alignment of the shafts and bearings.

Beneath the rolls 6, a discharge chute 14 is provided, comprising a rectangular frame 56 on which a plurality of rods 57 provided with resilient rubber coverings 57a are mounted in parallel relation and lengthwise of the chute frame to form a resilient potato receiving surface. Chute 14 may have its frame 56 mounted in fixed position on the frame, and potatoes are guided thereto by inclined side walls 58 leading from beneath the rolls to the chute, as seen most clearly in Fig. 1. A suitable receptacle can be placed at the discharge end of chute 14 to receive the potatoes therefrom.

The larger size potatoes which cannot pass through the opening 45 between the rolls 6, are advanced across the rolls in the manner heretofore described, by the urge of oncoming potatoes being discharged from the chute 5, and pass successively over the first set of sizing rolls 7 where the first commercial size is separated out, then over the intermediate transfer roll 8, and finally over the second set of sizing rolls 9 where the next larger size is separated out, and the remaining larger size potatoes discharged over the chute 10. It will be understood, of course, that the particular number of rolls 6, 7, 8 and 9 employed in the machine illustrated have been selected for purposes of illustration only, and any other number may be employed as desired, except that at least two of the sizing rolls are required as will be apparent.

The transfer roll 8 is of the same construction as the preliminary cleaning rolls 6 so that further description of this roll is believed unnecessary, and as the sizing rolls 7 and 9 are also alike in form and construction, except that the rolls 9 may be slightly larger than the rolls 7, a detailed description of the rolls 7 will suffice for both.

Figure 1:
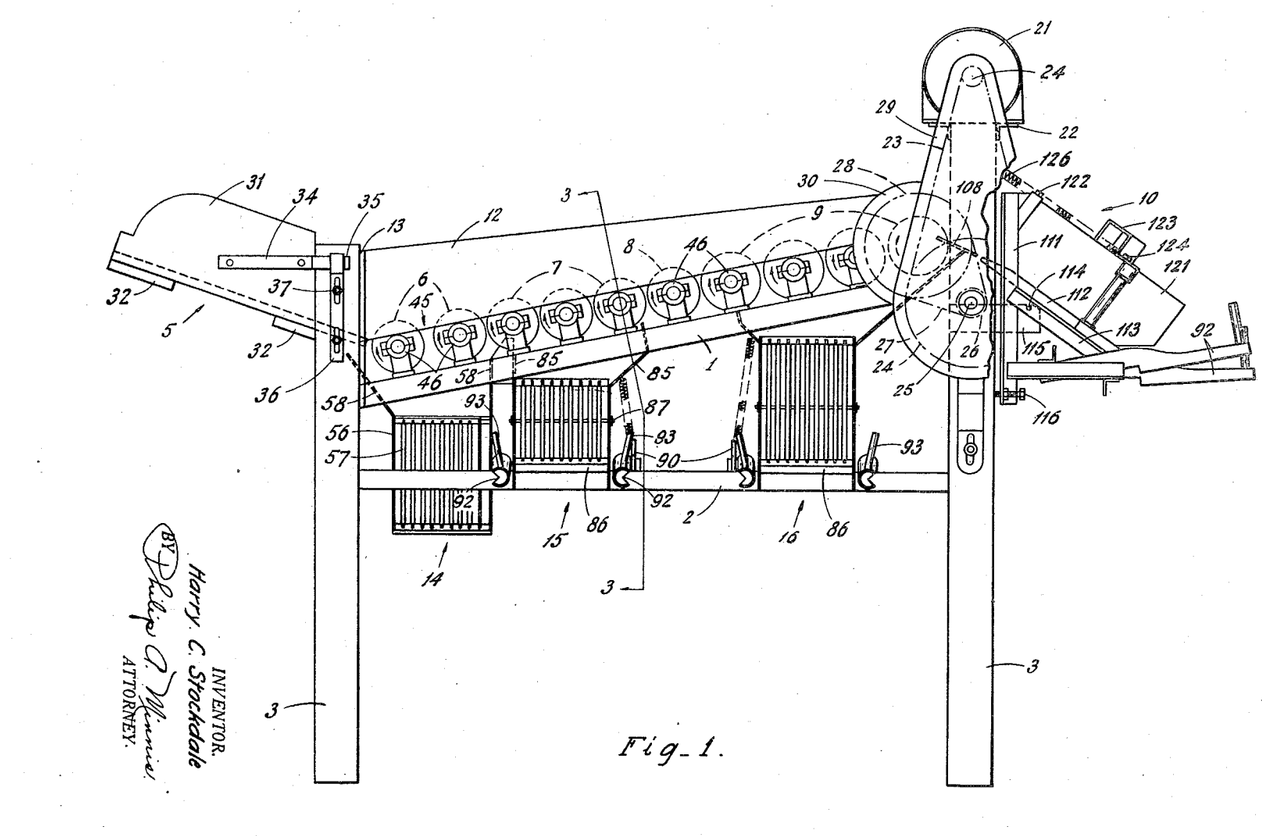
Fig. 1 is a side elevation of a sizer embodying my invention.

Each of the sizing rolls 7 is formed with a series of annular grooves of semi-circular cross-section so that the matching grooves of adjacent rolls cooperate to form circular sizing apertures, the grooves being provided with a multiplicity of rubber spurs or bristles extending radially of the apertures. It will be noted that the initial roll 7 forms with the adjacent roll 6 a plurality of small semi-circular sizing apertures 59 which form additional points of discharge for the smaller cull size potatoes which drop onto discharge chute 14 as shown in Fig. 1.

Figures 3, 4, 5, 6, 7:
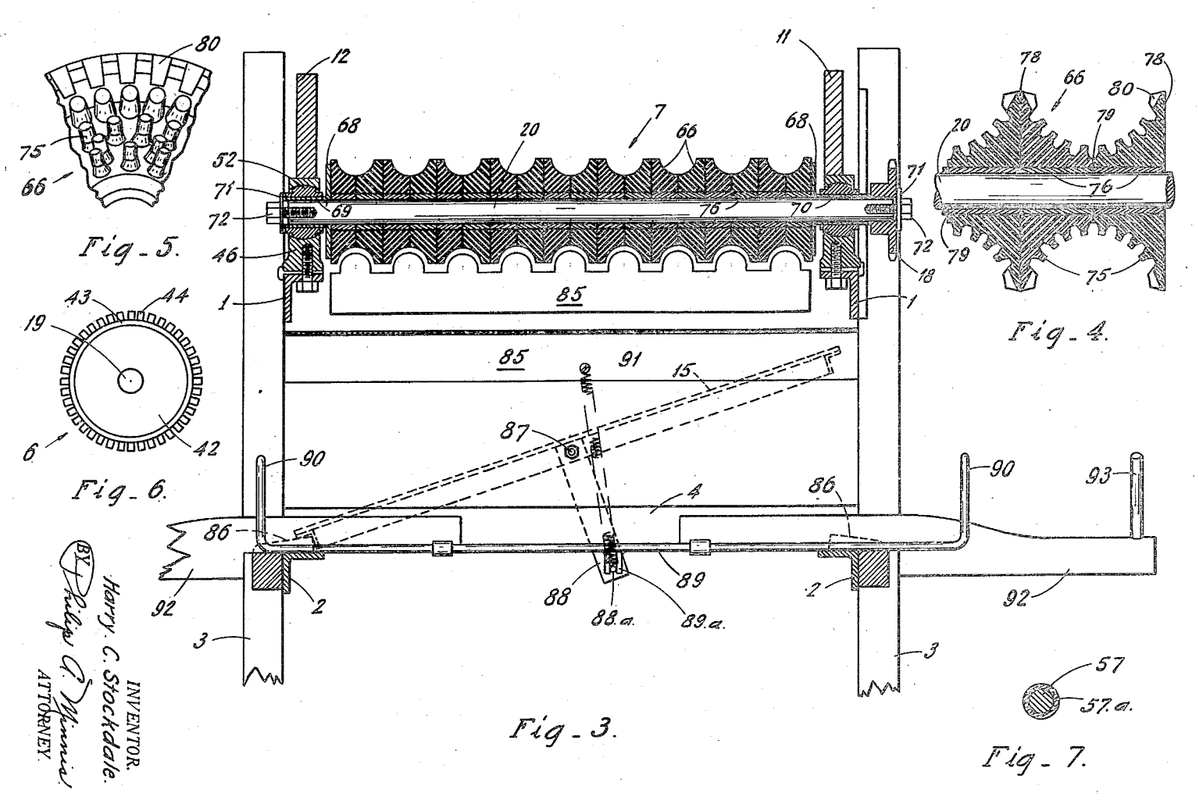
Fig. 3 is an enlarged vertical transverse section through the sizer taken in a plane indicated by the line 3—3 in Fig. 1, the outlines of the sizing rolls being indicated schematically.
Fig. 4 is an enlarged fragmentary sectional view of one of the sizing rolls.
Fig. 5 is an enlarged fragmentary elevational view of the face of one of the discs forming the sizing rolls.
Fig. 6 is an end elevational view of one of the cleaning rolls.
Fig. 7 is a transverse section through one of the rods forming the bottom of the discharge chutes or grids.

The radial arrangement of the rubber spurs is of considerable importance for reasons hereinafter pointed out, and to facilitate molding the bristles in this manner, the sizing rolls, as seen most clearly in Figs. 3 and 4, are made up of a series of pairs of complementary molded rubber spool sections or discs 66, secured in end to end relation on shaft 20 and so formed that each pair of spool sections cooperates to form one of the grooves. To hold the parts in assembled position, end washers or retaining discs 68 are placed at the ends of the series of discs and are engaged by respective sleeves 69 and 70, which are journalled in bearing sleeves 53 of the self-aligning bearings 46 previously described. Sleeve 69 is engaged at its outer end by washer 71 secured to the end of shaft 20 by a cap screw 72. At the other end of the shaft, sleeve 70 is in end to end relation with the hub of a drive sprocket 18 which is keyed to the shaft 20 and held in place by a similar washer 71 and cap screw 72. It will be seen, therefore, that the discs 66 of each sizing roll 7 are held securely in place in end to end relation on the shaft of the sizing roll.

Each disc 66 is of special construction to provide for accurate, effective sizing of the fruit and to enable the assembly thereof as described above, without distortion of the circular form of the sizing apertures. As seen most clearly in Fig. 4, each disc 66 is provided with a metallic bushing 76 to which the body of the section may be integrally bonded. The body of each disc is formed to provide flat end surfaces 78, 79 of differing radii which are joined by a curved surface forming an annular recess provided with a multiplicity of the radially projecting resilient spurs 75 arranged so that their tips define the quadrant of a circle. The outer edge of the disc at end surface 78 is provided with an annular rim in which radial slots are provided to form potato engaging projections 80 which cooperate with the spurs to complete the semi-circular groove. As seen in Figs. 3 and 4, where the discs 66 are assembled in end to end relation on the shaft to make up the roll, they form a series of annular grooves of semi-circular cross section along the roll, the face of each groove being formed by the tips of the radially extending rubber spurs. It will also be noted that the rigid bushings 76 serve to permit the discs to be drawn up snugly together in assembled relation while at the same time preventing excessive axial compression of the rubber disc bodies such as might distort the semi-circular form of the sizing grooves.

As will be seen, the several sizing rolls 7 and 9 when mounted in the machine in adjacent parallel relation as illustrated, cooperate to form sets of circular sizing openings between their adjacent peripheries, and as the potatoes are advanced across the rolls, the crowding action of the potatoes being fed therebehind, together with the tractive effect of the rolls, causes the potatoes to be agitated and turned about so that they are effectively presented to the sizing openings. The efficiency with which this takes place has been found in actual practice to be almost, if not entirely, unaffected even when the potatoes are fed to the machine in such volume as to cause them to pile up in passing over the rolls, due to the fact that the smaller potatoes work down very rapidly between and underneath the larger potatoes to find the proper size opening. The result is that irrespective of whether the potatoes be fed either in large or in small volume, all of them are properly presented to the sizing openings, and those corresponding in size to the opening to which they are presented are promptly discharged therethrough, while the larger sizes continue on over the rolls.

It is to be observed that the spurs not only brush the potatoes and thereby exert a cleaning action thereon, but they also serve an important function in the sizing operation. As heretofore pointed out, these spurs are arranged radially of the sizing openings so that their tips define the circular peripheries thereof, and the resiliency of the spurs precludes all danger of slightly oversize potatoes becoming gripped with sufficient force to injure them as they pass through the openings. Furthermore, the resiliency of the spurs also enables them to yield enough to permit the passage of potatoes having small warts or other protuberances on them, and which might otherwise either be damaged or pass over the proper size opening and be discharged into a larger size grade to which they do not belong.

The radial arrangement of the spurs with respect to the sizing openings prevents any material distortion however, of the circular form of the openings, since with this arrangement all of the spurs are presented radially of the potatoes passing through the openings, so that they present uniformly resilient contact surfaces all around the openings. Consequently, a potato presented to a sizing opening cannot deflect any of the spurs more easily than the others, so that potatoes of irregular shaped cross section are thus prevented from wedging their way through the openings by distorting their circular shape, and can only pass through those openings corresponding to the largest transverse diameters of the potatoes, as is desired.

Figure 2:
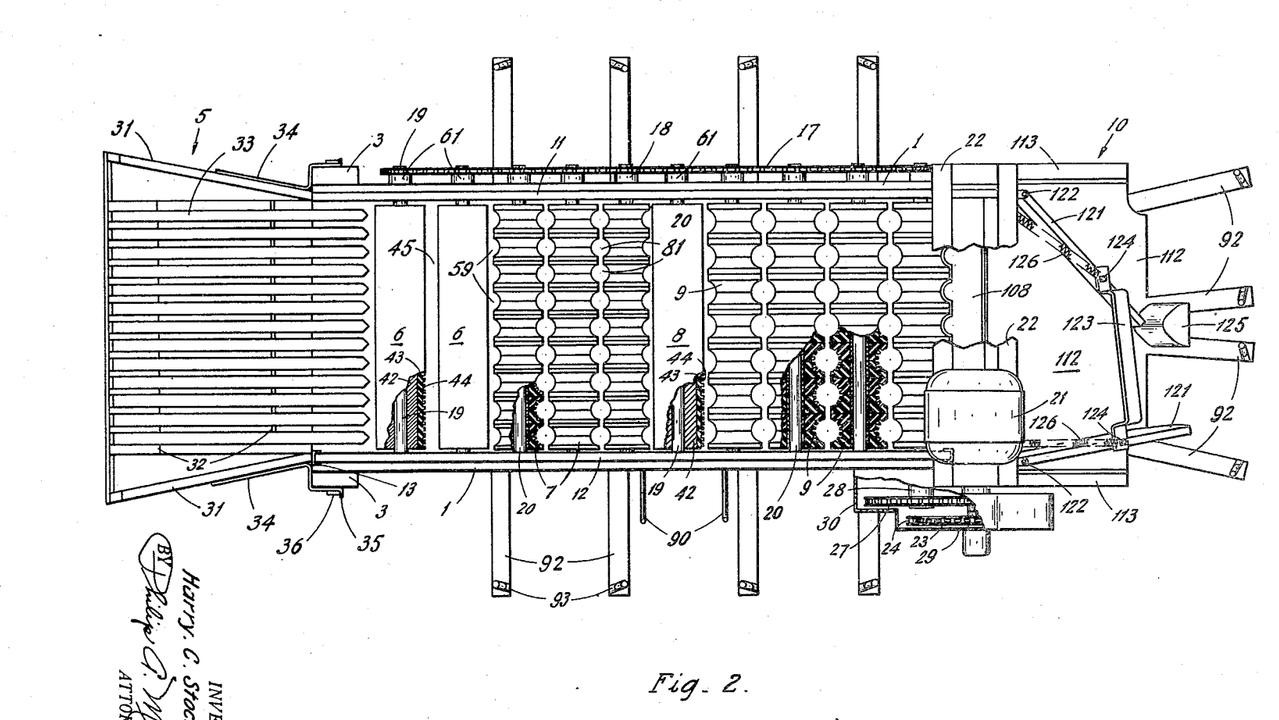
Fig. 2 is a plan view of the sizer shown in Fig. 1, the cleaning and sizing rolls being illustrated schematically except where they are broken away in section.

Accuracy of sizing is also preferably facilitated by driving the several sizing rolls in each group at progressively increased speeds, and for this purpose the drive sprockets associated with the three sizing rolls 7 may be so proportioned as to drive the middle roll somewhat faster than the left hand roll as viewed in Figs. 1 and 2, and to drive the right hand roll faster than the middle roll. Similarly the drive sprockets associated with the sizing rolls 9 may be so proportioned as to drive the second roll away from the transfer roll faster than the immediately preceding roll; the third roll faster than the second; and so on. Inasmuch as the spacing between the transfer roll 8 and the sizing rolls 7 and 9 immediately adjacent thereto, is limited so that no sizing action occurs in the valleys adjacent the transfer roll, the speed of the transfer roll may be less than the preceding sizing roll 7, and the speed of the first sizing roll 9 may be less than that of the transfer roll adjacent thereto. Thus, while the several rolls of each sizing section are driven at progressively increased speeds, the speed steps down at the transfer roll so that it is not necessary to provide progressively increasing roll speeds clear through the machine, which might require the rolls at the discharge end of the machine to be driven at excessive speeds.

When driven in this manner, it will be seen that there is a differential speed relation between the adjacent peripheries of the sizing rolls so that the upwardly moving spurs at each sizing opening travel faster than the downwardly moving spurs on the adjacent roll. The result is that the tractive effect of the rolls has a greater tendency to lift the potatoes out of the sizing openings than to force them through, so that potatoes which are slightly too large for a given size opening to which they are presented, are not permitted to settle down by their own weight and wedge through the opening, but are carried on over the roll for presentation to succeeding sizing openings. The differential tractive effect of the rolls also materially improves the brushing action of the spurs.

The particular rotative speeds of the rolls, as will be apparent, may be selected over a wide range with satisfactory results, although they should of course be sufficient to insure adequate cleaning, and also preferably within such a range as to provide for advance of the product by the displacement method heretofore referred to. For purposes of illustration, however, it may be said that in a machine employing sizing rolls 7 of 4¼" outside diameter with grooves providing 1½" sizing openings, a transfer roll 8 of 4¼" outside diameter, and sizing rolls 9 of 4¾" outside diameter with grooves providing 1⅞" sizing openings, the following sequence of speeds beginning with the left hand roll 7 as seen in Figs. 1 and 2 have been found satisfactory: 65, 68.6, 72.6, 68.6, 58.8, 61.7, 65, and 68.6 R. P. M. respectively It will be noted that because of the adjustable mounting of the bearings for supporting the sizing rolls, the size of opening between adjacent rolls can be maintained accurately to compensate for wear on the ends of the spurs, or to obtain any slight variation in size of opening which the user may desire. Also, any such adjustment can be made readily by virtue of the self-aligning character of the bearings.

Below the groups of sizing rolls 7 and 9, adjustable discharge chutes 15 and 16 are mounted for receiving and discharging the potatoes dropping through the sizing openings between the rolls, and as these chutes are of similar construction, a description of the chute 15 will suffice for both. As seen most clearly in Figs. 1 and 3, the discharge chute 15 extends transversely of the machine beneath the sizing apertures formed by rolls 7, to receive potatoes as delivered thereto between the respective side walls 85 of the chute, which are suitably mounted on the frame and extend from between side rails 1 at their upper ends to lower side rails 2. If desired, the upper end of the side wall 85 adjacent the first sizing roll 7 may be formed to project into the grooves of the first sizing roll 7 to prevent any possibility of a culled potato being accidentally carried into the potatoes sized by the rolls 7.

Discharge chute 15 is provided with a grid-like bottom comprising a frame carrying a plurality of rubber covered rods, as described in connection with discharge chute 14, and is pivotally mounted on a transverse rod 87 extending between side walls 85 of the chute and having its ends journalled in and projecting through the walls. By adjusting the discharge grid about the axis of rod 87 (Fig. 3), it can be positioned either as shown, or in an oppositely angled position to reverse the side of the machine to which the potatoes are delivered. In either position, an end of the chute grid engages a stop 86 over which the potatoes are delivered from the chute.

To effect adjustment of the grid, it is provided with a downwardly extending arm 88 which is suitably connected as by pin 88a, with a depending slotted lug 89a of a control slide 89 therefor. The control slide may be mounted in any convenient manner for movement transversely of the frame on lower side rails 2 to control the angularly adjusted position of the chute grid. At its ends, the control slide has upturned handle portions 90 to facilitate manual adjustment thereof. To maintain the adjusted position of the chute grid, a spring 91 is connected to pin 88a at its lower end, and at its upper end to the adjacent wall 85 at a point substantially in vertical alignment with rod 87. Thus, as the lower end of arm 88 passes to either side of rod 87 in changing the discharge position of the chute, spring 91 is effective to maintain the selected adjusted position thereof.

At either end of the discharge chutes, pairs of bag holding arms 92 having operating handles 93 may be provided. These bag holding arms are fully disclosed and claimed in my copending application Serial No. 660,295, filed March 10, 1933, and as they form no part of the present invention except as they may be associated therewith, it is believed unnecessary to describe them in detail. Their purpose is to hold the upper edges of the open ends of bags to be filled so that potatoes from the discharge end of chute 15 are received in the bag. With this arrangement, the flow of potatoes over the sizer need not be interrupted, as when a bag on one side is filled, the flow of potatoes can be immediately transferred to an empty bag on the other side while the filled bag is removed and replaced by another bag.

The largest size potatoes which fail to pass through the sizing openings are discharged from the machine over discharge ramp 108 at the discharge end of the rolls, and into discharge hopper 10. To provide for even movement of the potatoes thereover and to avoid abrasion of the potatoes, discharge plate 108 is formed to extend into the grooves of the final roll 9 as seen in Fig. 2.

The discharge hopper is removably mounted on the frame and is constructed to provide selective discharge potatoes to either of two bagging stations. As seen in Figs. 1 and 2, discharge hopper 10 includes vertical standards 111 to which inclined bottom 112 is suitably secured. The hopper bottom 112 and standards 111 carry side angles 113, on each of which a pin 114 is provided for engagement with cooperating notches in the upper edges of outwardly extending brackets 115 secured to the corner posts 3. At its lower end, each standard 111 carries a set screw 116 adjustably secured therein by a suitable lock nut, and extending therethrough for engagement with the adjacent post 3. By adjusting screws 116, the angular position of the discharge hopper with respect to the discharge plate 108 can be varied.

To provide for selective discharge of the potatoes from the hopper, the upper ends of a pair of converging shunts 121 are pivoted by bolts 122 at each side of hopper bottom 112, and the shunts are connected intermediate their ends by a cross bar 123 pivoted thereto at 124. At the outer end of bottom 112, dividing block 125 is mounted thereon in a central position for cooperation with the discharge end of either of shunts 121. The length of cross bar 123 and its points of connection to the shunts 121 are selected so that when one shunt 121 is at an extreme position at one side of the hopper, the other registers with dividing block 125 as shown in Fig. 2. An adjusted position of the shunts is maintained by respective springs 126 secured at 124 to each shunt and to the frame. To either side of dividing block 125, a pair of bag holders 92 are provided similar to those described in connection with the discharge chutes.

From the above description, it will be noted that the discharge hopper can be adjusted to divert the largest size potatoes to bags at either of two different bagging stations and is removably mounted so that it can be taken off the frame merely by lifting the pins 114 out of the notches in frame extension 115. This detachable mounting contributes to the provision of an extra sizing section, if such be desired, as illustrated in Fig. 10.

The extra sizing section or attachment comprises a frame 131 which at each side has a pin 132 for engagement with the notch of the adjacent bracket 115, and also has an adjusting set screw 133 for engagement with the adjacent post 3. Frame 131 carries sizing rolls 136 similar in construction to rolls 7 and 9 except that the sizing apertures are of larger size, the potatoes being transferred to rolls 136 over discharge ramp 137 mounted on the attachment frame 131 and resting on discharge ramp 108. Ramp 137 is formed similarly to ramp 108 to extend into the grooves of rolls 136.

Figure 10:
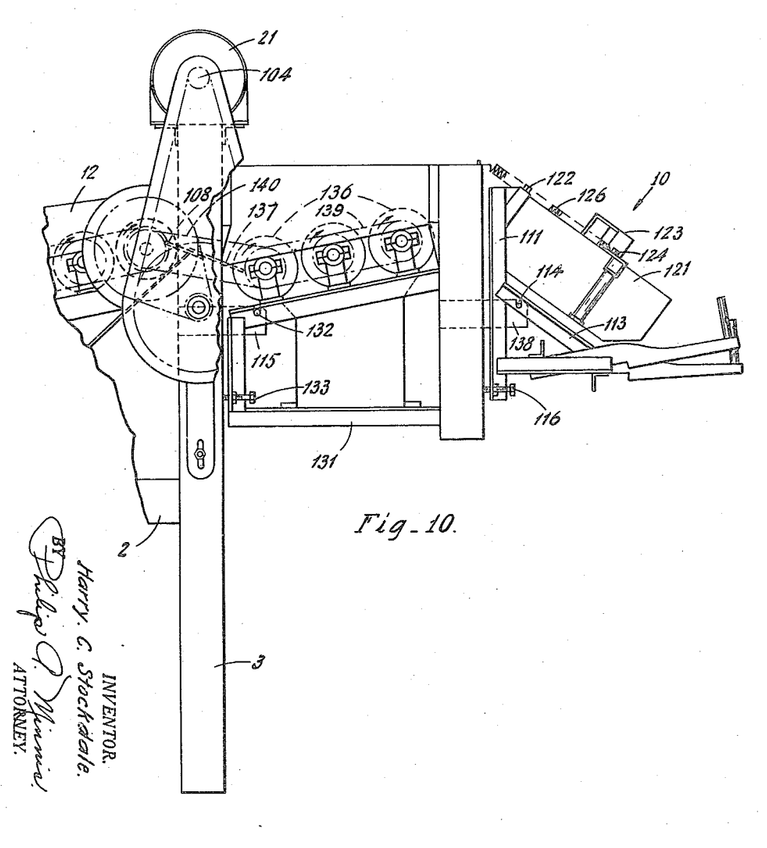
Fig. 10 is a fragmentary side elevational view of the discharge end of the sizer shown in Fig. 1, and illustrates an additional detachable sizing section mounted on such discharge end.

Discharge hopper 10 which is shown in Fig. 1 as mounted directly on the frame of the machine proper, is mounted in a similar manner in Fig. 10 on attachment frame 131, each pin 114 engaging in a bracket 138 carried by frame 131 and each set screw 116 engaging one of the corner posts of frame 131. Rolls 136 may be interconnected by a chain 139 and driven by a sprocket and chain arrangement 140 from the end roll 9. It will be understood that rolls 136 may also be driven in a differential speed relation, similarly to the rolls 7 and 9. As an illustrative example, when rolls 136 of 4¾ inches outside diameter and having grooves providing 2¼ inch openings are employed, satisfactory results may be obtained by driving them at 53.7, 65 and 82.4 R. P. M. respectively beginning with the left hand roll as seen in Fig. 10.

From the above description, it is believed that the operation of the machine will be apparent. Potatoes dumped into the feed hopper 5 will roll onto the cylindrical cleaning rolls 6 over which they are advanced by the combined tractive action of the rotating rolls and the urge of oncoming potatoes. As the potatoes pass over the rolls 6, the cull size potatoes are discharged through opening 45 between the rolls and openings 59 between the first grooved sizing roll 7 and the adjacent roll 6.

The potatoes larger than cull size are subjected to a cleaning operation as they advance over the rolls 6 and then pass onto the grooved sizing rolls 7 where the first size of potatoes larger than culls are discharged through the sizing openings 81. By reason of the circular sizing openings 81 defined by the resilient spurs 75 extending radially of the openings, and also by virtue of the differential speed relation between the rolls, the potatoes are subjected to a further cleaning action on the sizing rolls and only those of proper size are discharged through the sizing openings as they pass over the rolls.

Potatoes too large to pass through the openings advance over the sizing rolls 7 and transfer roll 8 to the grooved rolls 9 of the next sizing section. Where a similar action takes place, the next larger size potatoes passing through the larger sizing openings formed by rolls 9 onto discharge chute 16 as described in connection with rolls 7 and the largest potatoes are discharged to hopper 21, or if the detachable sizing section is used, to the grooved rolls 136 for another sizing operation.

While I have shown and described a preferred embodiment of my invention as it may be employed for sizing potatoes, it will be understood that it may be employed to advantage for sizing other vegetables or fruits as well, and the term "potatoes" as used in the appended claims is to be construed as including such other products. It will also be understood that the illustrated embodiment is susceptible of variation and modification without departing from the scope of the invention as defined in the appended claims.

Having now described my invention, and in what manner the same may be used, what I claim as new and desire to protect by Letters Patent is:

1. In a sizer for potatoes or the like, a plurality of parallel rolls arranged transversely to the flow of potatoes thereover, and having semi-circular peripheral grooves defined by resilient spurs extending substantially radially of said grooves, whereby adjacent rolls cooperate to form substantially circular sizing openings therebetween, and means for rotating said rolls in the same direction.

2. In a sizer for potatoes or the like, a plurality of parallel sizing rolls arranged transversely to the flow of potatoes thereover, each sizing roll having semi-circular peripheral grooves defined by soft rubber spurs extending radially of said grooves, whereby aligned grooves of adjacent rolls cooperate to form substantially circular sizing openings therebetween.

3. In a sizer for potatoes or the like, a plurality of parallel sizing rolls arranged transversely to the flow of potatoes thereover, each sizing roll having semi-circular peripheral grooves defined by yieldable brushing means extending radially of said grooves, whereby aligned grooves of adjacent rolls cooperate to form substantially circular sizing openings therebetween.

4. In a sizer for potatoes or the like, a plurality of parallel sizing rolls arranged transversely to the flow of potatoes thereover, each sizing roll having semi-circular peripheral grooves defined by yieldable brushing means extending radially of said grooves, whereby aligned grooves of adjacent rolls cooperate to form substantially circular sizing openings therebetween, and means for driving said rolls in the same direction and to provide a higher speed drive for the roll having its brushing means travelling up at an opening than for the cooperating roll having its brushing means travelling down at an opening.

5. In a sizer for potatoes or the like, a plurality of parallel sizing rolls arranged transversely to the flow of potatoes thereover, each sizing roll having semi-circular peripheral grooves defined by resilient spurs extending radially of said grooves, whereby aligned grooves of adjacent rollers cooperate to form substantially circular sizing openings therebetween, and means for driving said rolls in the same direction providing a higher speed drive for the roll having its spurs travelling up at an opening than for the roll having its spurs travelling down at an opening.

6. In a sizer for potatoes or the like, a plurality of sizing sections, each section including a plurality of parallel rolls arranged transversely to the flow of potatoes thereover and having semi-circular peripheral grooves defined by resilient spurs extending radially of said grooves, whereby adjacent rolls of a section cooperate to form substantially circular sizing openings therebetween, means for rotating said rolls in the same direction, and means for transferring potatoes between said sections.

7. In a sizer for potatoes or the like, a plurality of sizing sections, each section including a plurality of parallel rolls arranged transversely to the flow of potatoes thereover, each roll having semi-circular peripheral grooves defined by yieldable protuberances extending radially of said grooves and forming the potato contacting surface of said rolls, whereby adjacent rolls of a section cooperate to form substantially circular sizing openings therebetween, means for rotating said rolls in the same direction, and a cylindrical brushing roll for transferring potatoes between said sections.

8. In a sizer for potatoes or the like, a plurality of sizing sections, each section including a plurality of parallel rolls arranged transversely to the flow of potatoes thereover, each roll having semi-circular peripheral grooves defined by resilient spurs extending radially of said grooves, whereby adjacent rolls of a section cooperate to form substantially circular sizing openings therebetween, means for transferring potatoes from one section to another, and means for rotating said rolls in the same direction including means for driving successive rolls in a section at progressively higher speeds in the direction of travel of the potatoes, said potato transferring means enabling a step down in speed from the last roll of a section to the first roll of the adjacent section.

9. In a sizer for potatoes or the like, a pair of sizing sections arranged in sequence, each section including a plurality of parallel sizing rolls arranged transversely to the flow of potatoes thereover, and each roll having annular semi-circular peripheral grooves defined by resilient spurs whereby adjacent rolls of a section cooperate to form substantially circular sizing openings therebetween, the sizing openings of the succeeding section being larger than those of the preceding section, a cylindrical brushing and transfer roll between the sections, and means for rotating said rolls in the same direction including means for driving successive sizing rolls in each section at progressively higher speeds in the direction of travel of the potatoes, said transfer roll enabling a step down in speed from the last roll of the preceding section to the first roll of the succeeding section.

10. A sizer for potatoes or the like, comprising a plurality of parallel cleaning rolls for receiving potatoes fed to the sizer and arranged transversely to the flow of potatoes thereover, each said cleaning roll having its potato engaging surface formed by yieldable spurs, said cleaning rolls being spaced apart to permit discharge of small potatoes therebetween, a set of parallel sizing rolls arranged in parallel relation to said cleaning rolls for receiving potatoes therefrom, each sizing roll having semi-circular peripheral grooves defined by resilient spurs extending radially of said grooves whereby adjacent sizing rolls cooperate to form substantially circular sizing openings therebetween, means for transferring potatoes from said sizing rolls, a second set of sizing rolls for receiving potatoes from said transferring means similar to said first set but having sizing openings of greater diameter, and means for driving all said rolls in the same direction.

11. A sizer for potates or the like, comprising a plurality of parallel cleaning rolls for receiving potatoes fed to the sizer and arranged transversely to the flow of potatoes thereover, each said cleaning roll having its potato engaging surface formed by yieldable brushing spurs, said cleaning rolls being spaced apart to permit discharge of small potatoes therethrough, a set of parallel sizing rolls arranged in parallel relation to said cleaning rolls for receiving potatoes therefrom, each sizing roll having semi-circular peripheral grooves defined by resilient spurs extending radially of said grooves whereby adjacent sizing rolls cooperate to form substantially circular sizing openings, means for transferring potatoes from said sizing rolls, a second set of sizing rolls similar to said first set but having sizing openings of greater diameter, means for driving all said rolls in the same direction including means for driving each successive sizing roll in a set at a progressively higher speed in the direction of travel of the potatoes, said potato transferring means enabling a step down in speed between the last roll of said first set and the first roll of said second set, and a delivery chute beneath each set of sizing rolls mounted for adjustment to deliver potatoes to either side of the sizer.

12. A roll for a sizing machine comprising a series of similar discs of resilient material, each disc having a substantially flat face on one side and an annular recess of arcuate cross section extending from the periphery adjacent said one side to the other side, said recess being defined by resilient spurs extending substantially radially thereof, successive discs facing in opposite directions to form a series of substantially semi-circular parallel grooves in said roll defined by said resilient spurs.

13. A roll for a sizing machine comprising a series of similar discs of resilient material, each disc comprising a core of rigid material and a body of resilient material, each disc having a substantially flat face on one side and an annular recess in said body of arcuate cross section extending from the disc periphery adjacent said one side to the other side and defined by resilient spurs extending substantially radially of said recess, successive discs facing in opposite directions to form a series of substantially semi-circular grooves along said roll defined by said resilient spurs, and the cores of said discs being assembled in end to end relation to prevent deformation of said grooves.

14. As an article of manufacture, a section for a potato sizing roll comprising a molded disc of resilient material having side faces of differing radii joined by an annular recessed surface forming a groove, the cross section of the groove being substantially a quadrant of a circle, said recessed surface being defined by resilient fingers extending substantially radially of said groove.

15. In a sizer for potatoes or the like, a pair of sizing sections arranged in sequence, each section including a plurality of parallel sizing rolls arranged transversely to the flow of potatoes thereover and having annular semi-circular peripheral grooves whereby adjacent rolls of a section cooperate to form substantially circular sizing openings therebetween, the sizing openings of the succeeding section being larger than those of the preceding section, a cylindrical transfer roll between the sections, and means for rotating said rolls in the same direction including means for driving successive sizing rolls in each section at progressively higher speeds in the direction of travel of the potatoes and also including means for driving the first roll of the succeeding section at a lower speed than the last roll of the preceding section.

16. A machine for sizing potatoes or the like comprising a plurality of parallel rolls arranged transversely to the flow of potatoes thereover, said rolls being provided with mating semi-circular peripheral grooves having a plurality of yieldable potato engaging protuberances mounted in and extending substantially radially of said grooves, whereby the mating grooves of adjacent rolls cooperate to form substantially circular sizing openings with said yieldable protuberances positioned radially of the openings, and means for rotating said rolls in a common direction.

17. A sizer for potatoes or the like, comprising a pair of sizing sections arranged in sequence, each section including a plurality of parallel sizing rolls arranged transversely to the flow of potatoes thereover and having complementary annular grooves arranged in mating relation to form sizing openings between the rolls, the sizing openings of the succeeding section being larger than those of the preceding section, driving means for rotating said rolls in a common direction including means for rotating the rolls in each section at progressively higher speeds in the direction of flow of the potatoes thereover and for rotating the initial roll of the succeeding section at a lower speed than the terminal roll of the preceding section, and means interposed between said initial and terminal rolls for cooperation therewith to prevent the discharge between the sizing sections of potatoes which are too large for passage through the sizing openings of said preceding sizing section.

18. A sizer for potatoes or the like, comprising a pair of sizing sections arranged in sequence, each section including a plurality of parallel sizing rolls arranged transversely to the flow of potatoes thereover and having complementary annular grooves arranged in mating relation to form sizing openings between the rolls, the sizing openings of the succeeding section being larger than those of the preceding section, driving means for rotating said rolls in a common direction including means for rotating the rolls in each section at progressively higher speeds in the direction of flow of the potatoes thereover and for rotating the initial roll of the succeeding section at a lower speed than the terminal roll of the preceding section, and potato supporting means interposed between said initial and terminal rolls for cooperation with said terminal roll to prevent the discharge through the adjacent portions of the grooves in said terminal roll of potatoes which are too large for passage through the sizing openings of said preceding sizing section.

19. A sizer for potatoes or the like, comprising a pair of sizing sections arranged in sequence, each section including a plurality of parallel sizing rolls arranged transversely to the flow of potatoes thereover and having complementary annular grooves arranged in mating relation to form sizing openings between the rolls, the sizing openings of the succeeding section being larger than those of the preceding section, driving means for rotating said rolls in a common direction including means for rotating the rolls in each section at progressively higher speeds in the direction of flow of the potatoes thereover and for rotating the initial roll of the succeeding section at a lower speed than the terminal roll of the preceding section, and potato supporting means interposed between said initial and terminal rolls and cooperable with said terminal roll to limit the groove openings formed between said terminal roll and supporting means to a lesser size than the sizing openings in said preceding sizing section.

HARRY C. STOCKDALE.